UNITED STATES PATENT OFFICE.

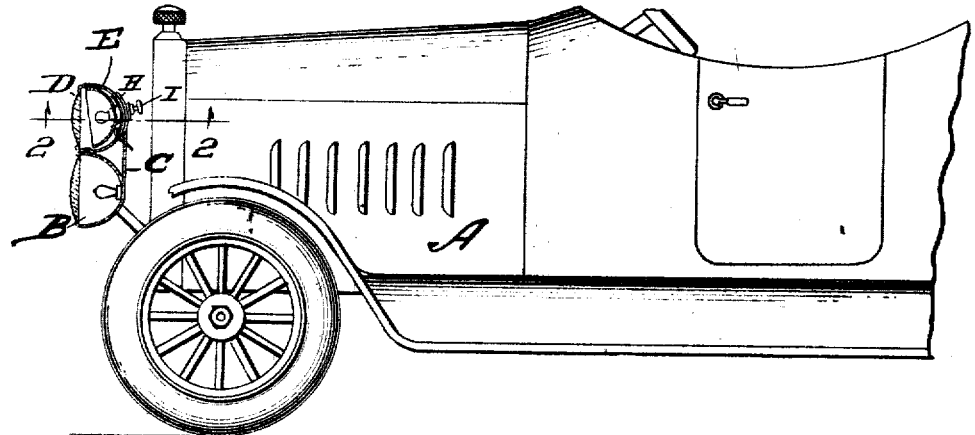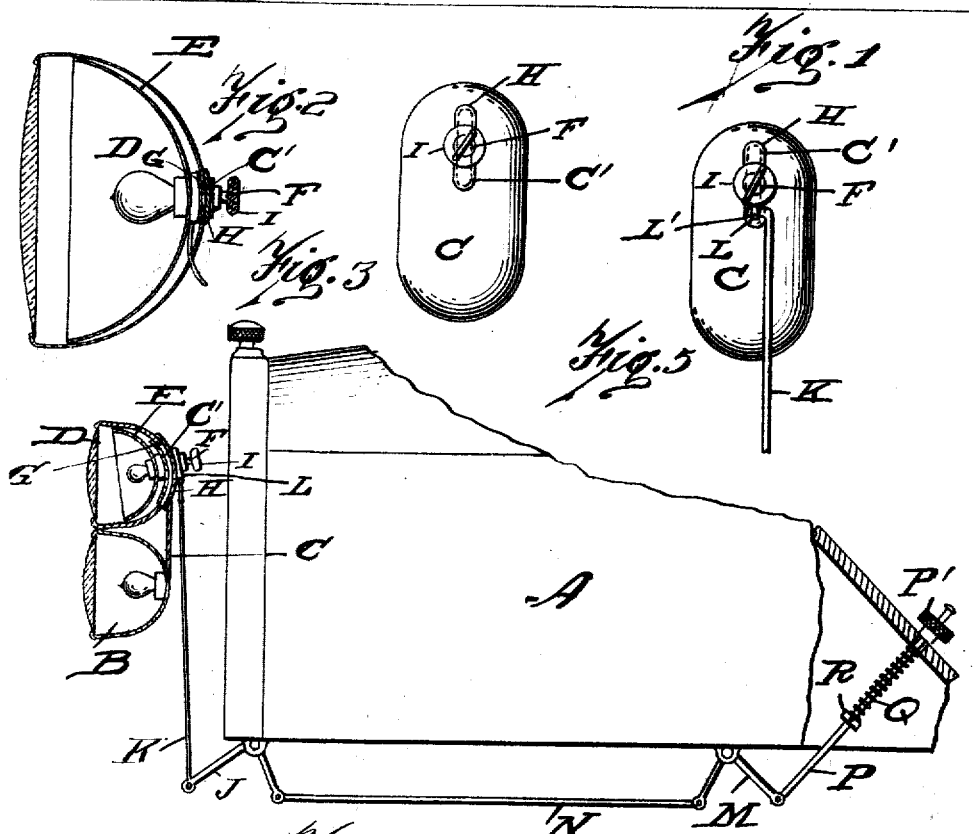

AARON H. GOULD AND NATHANIEL O. GOULD, OF DETROIT, MICHIGAN.

AUTOMOBILE-LAMP.

1,368,430.    Specification of Letters Patent.    Patented Feb. 15, 1921.

Application filed November 8, 1919. Serial No. 336,540.

*To all whom it may concern:*

Be it known that we, AARON H. GOULD and NATHANIEL O. GOULD, citizens of the United States, residing at Detroit, county of Wayne, State of Michigan, have invented a certain new and useful Improvement in Automobile-Lamps, and declare the following to be a full, clear, and exact description of the same, such as will enable others skilled in the art to which it pertains to make and use the same, reference being had to the accompanying drawings, which form a part of this specification.

Our invention relates to driving lamps for automobiles shown in the accompanying drawings and more particularly described in the following specification and claims.

It is well known that the usual "head lights" forming the equipment of a motor car can not be used on city streets or roads over which there is much traffic due to the "blinding effect" they have upon drivers of approaching vehicles, it has therefore been customary to employ "dimmers", or lights of low candle power which may be alternately switched on or off as occasion requires. The use of "dimmers" makes it exceedingly difficult for the driver of the vehicle to see the condition of the road he is about to travel over unless the road is otherwise well lighted.

It is therefore one of the objects of the present invention to provide in connection with the usual "range" of "head lights" of the vehicle, a pair of "driving lights", respectively located either above or below the head lights and which may be adjusted so as to project their rays of light downwardly upon the road at such an angle as will give the driver a clear view of the condition of the road he is approaching but which will not "blind" or inconvenience the driver of an approaching vehicle.

A further object is to provide means whereby the driving lights may be adjusted by the driver so as to light the road to a greater or less extent in front of the vehicle as desired, the lamps being then secured in their adjusted position so that the rays of light may be constant in a fixed direction.

With the foregoing and other objects in view which will appear as the description proceeds, the invention resides in the combination and arrangement of parts and in the details of construction hereinafter described and claimed, it being understood that changes may be made in the embodiment of the invention herein disclosed without departing from the spirit of the same.

In the accompanying drawings forming part of this specification:—

Figure 1 is a fragmentary side elevation of a motor vehicle showing in vertical section the "head" and driving lamps installed thereon.

Fig. 2 is a horizontal sectional view of the driving lamp taken on or about line 2—2 of Fig. 1.

Fig. 3 is a rear elevation of the inclosing case for the head and driving lamps.

Fig. 4 is a fragmentary side elevation of the front end of a motor vehicle with parts in section showing means for adjusting the driving light from the driver's seat.

Fig. 5 is a detail view showing the manner of engaging the link connecting the driving lamp with the operating means shown in Fig. 4.

Referring now to the letters of reference placed upon the drawings:—

A, denotes an automobile, B, its head light inclosed in a case C, suitably supported upon the vehicle.

D, indicates a driving lamp preferably located directly above the head light in the case supporting the latter, it may however be placed below the head light if preferred.

E, is an adjustable reflector fitted with a suitable lamp socket to receive the bulb.

The case C is preferably adapted to house the head light and driving light, they may however, be independently supported if desired.

C', denotes a slot in the wall of the case through which projects a bolt F carried by the reflector E. G and H are plates overlapping the slotted opening in the case provided with a hole for the passage of the bolt F. I is a thumb-nut engaging the bolt F, for securing the reflector in its adjusted position.

In Fig. 4 is shown means for adjusting the reflector E from the driver's seat, consisting of a bell-crank J, pivoted to the frame of the vehicle and connected by a link K, with a washer L, sleeved on the bolt F;—the washer having a lug L' pierced to receive the end of the link K. M is a bell-crank pivoted to the frame of the vehicle and connected to the bell-crank J, by a link N. P is a screw-threaded rod pivoted to the bell-crank M, and extending up through the floor of the car where it is fitted with thumb-nut P'.

Q is a spring sleeved on the rod, one end of which bears against the floor of the vehicle and the other against a nut R secured to the rod P.

By adjusting the nut P' the reflector E may be tilted as required;—it being understood that the nut I at the back of the lamp is released sufficiently to permit the adjustment of the reflector by the nut P'.

The means shown on Fig. 4 for adjusting the reflectors from the driver's seat may be employed or not as preferred, it however, provides a convenient means for regulating the adjustment of the reflectors without leaving the vehicle.

Having thus described our invention, what we claim is:—

1. In combination with the head or range lamps of a motor driven vehicle set to direct their rays in a fixed and substantially horizontal direction, of auxiliary adjustable lamps located adjacent to the fixed or range lamps, an adjustable reflector provided with means for supporting a lamp, a bolt secured to the adjustable reflector, a case for housing each pair of fixed and adjustable lamps slotted for the passage of the bolt, means for tilting the adjustable reflector from the driver's seat including an adjustable floor push-rod adapted to be manually operated for actuating said tilting means.

2. In combination with the head or range lamps of a motor driven vehicle set to direct their rays in a fixed and substantially horizontal direction, of auxiliary adjustable lamps located adjacent to the fixed or range lamps, an adjustable reflector provided with means for supporting a lamp, a bolt secured to the adjustable reflector, an elongated case adapted to house therein the fixed and the adjustable lamp and slotted for the passage of the bolt, means connected with the adjustable bolt for tilting the reflector from the driver's seat, including a floor push-rod adapted for manual operation whereby the tilting means may be actuated, and resilient means for returning said rod to its initial position when released from manual control.

In testimony whereof, we sign this specification in the presence of two witnesses.

AARON H. GOULD.
NATHANIEL O. GOULD.

Witnesses:
S. E. THOMAS,
MARIE PETERSEN.